United States Patent [19]

Kok et al.

[11] Patent Number: 5,439,791
[45] Date of Patent: Aug. 8, 1995

[54] MODIFIED GELATIN TYPES AND HYDROPHILIC ELEMENTS CONTAINING THEM

[75] Inventors: Piet Kok, Gent; Jean-Marie Dewanckele, Drongen; Johan Loccufier, Zwijnaarde; Eddy Michiels, Duffel; Frank Michiels, Arendonk, all of Belgium

[73] Assignee: Agfa-Gevaert, N.V., Mortsel, Belgium

[21] Appl. No.: 194,513

[22] Filed: Feb. 10, 1994

[30] Foreign Application Priority Data

Mar. 8, 1993 [EP] European Pat. Off. ............ 93200655

[51] Int. Cl.$^6$ ................................................. G03C 1/30
[52] U.S. Cl. .................................... 430/622; 430/621; 430/642; 430/539
[58] Field of Search ................. 430/621, 622, 642, 539

[56] References Cited

U.S. PATENT DOCUMENTS

| | | | |
|---|---|---|---|
| 3,168,510 | 2/1965 | Krajewski | 530/354 |
| 4,238,480 | 12/1980 | Sawyer | 424/177 |
| 4,863,841 | 9/1989 | Okamura et al. | 430/621 |
| 5,219,992 | 6/1993 | Specht et al. | 530/354 |
| 5,316,902 | 5/1994 | Specht et al. | 430/539 |

FOREIGN PATENT DOCUMENTS 0020014 12/1991 WIPO.

*Primary Examiner*—Thomas R. Neville
*Attorney, Agent, or Firm*—Breiner & Breiner

[57] ABSTRACT

New types of modified gelatins are disclosed, modified at part of the free carboxyl groups of the polypeptide chain, by the introduction of a new end-standing amino, sulphinic acid or thiol group. The modified gelatins show an enhanced reactivity towards vinylsulphonyl hardeners. The invention further includes hardened modified gelatin types and hydrophilic elements containing them. In particular, a differentially hardened multilayer element, preferably a photographic element, is disclosed.

14 Claims, 1 Drawing Sheet

MODIFIED GELATIN TYPES AND HYDROPHILIC ELEMENTS CONTAINING THEM

DESCRIPTION

1. Field of the invention

The present invention relates to new types of modified gelatin and to multilayer hydrophilic elements, in particular photographic elements, containing such a new type of modified gelatin.

2. Background of the invention

In conventional photographic materials gelatin still is the most commonly used hydrophilic binder in the photosensitive and non-photosensitive hydrophilic coated layers. As well known to those skilled in the art gelatin is prepared from collagen. Details on the preparation of gelatin are described in e.g. "the Science and Technology of Gelatin", A. G. Ward and A. Courts, Academic Press 1977, p. 295. Gelatin consists of a three-dimensional network of polypeptide chains. Each polypeptide chain is built-up by repeating units of about twenty different amino acids linked together by peptide bonds. The dicarboxylic amino acids, i.c. aspartic acid and glutamic acid, provide the free (unbonded) carboxyl groups in the polypeptide chain, while the free amino groups are provided by amino acids, containing more than one amino group, e.g. lysine and arginine. Free carboxylic groups and free amino groups can act as so-called functional groups in several chemical reactions, e.g. modification reactions and hardening reactions. The ratio of free carboxylic and free amino groups determines the so-called isoelectric point, the pH at which the gelatine molecule is electrically neutral. Low isoelectric point gelatines and high isoelectric point gelatines exist depending on the chemical treatment (acid or alkaline) of the collagen of which they are derived.

In order to be easy to handle without risk to physical damage photographic materials have to be appropriately hardened. Hardening agents include those of the epoxide type, those of the ethylenimine type, chromium salts e.g. chromium acetate and chromium alum, aldehydes e.g. formaldehyde, glyoxal, and glutaraldehyde, N-methylol compounds e.g. dimethylolurea and methyloldimethylhydantoin, dioxan derivatives e.g. 2,3-dihydroxy-dioxan, active vinyl compounds e.g. 1,3,5-triacryloyl-hexahydro-s-triazine, active halogen compounds e.g. 2,4-dichloro-6-hydroxy-s-triazine, and mucohalogenic acids e.g. mucochloric acid and mucophenoxychloric acid. These hardeners can be used alone or in combination. The binders can also be hardened with fast-reacting hardeners such as carbamoylpyridinium salts as disclosed in U.S. Pat. No. 4,063,952.

Usually the hardening reaction implies an intramolecular and/or inter-molecular cross-linking of polypeptide chains. The hardening agents can be built-in in the polypeptide network between functional groups during the hardening reaction. Alternatively, they can merely activate a functional group catalysing in this way the formation of an intra- or inter-molecular amide bond, without being built-in themselves. This is, for instance, the case with carbamoylpyridinium salt hardeners.

Among the chemical classes of hardeners an especially useful class is formed by the olefinic hardeners, and more particularly by the vinylsulphonyl hardeners, e.g. bis(vinylsulphonyl)methane (BVSM). These hardeners usually provide a good compromise between abrasion resistance, degree of swelling of the layer(s), and hardening speed. These hardeners are built-in during the hardening reaction between two free amino functions.

The degree of hardening is usually established by the emulsion technologist on grounds of the best obtainable compromise between physical and photographic properties. For instance, excessive hardening will give rise to a high abrasion resistance but may result in poor developability and/or fixability due to limited swelling of the emulsion layer preventing in this way a fast and/or sufficient uptake of developing agents during processing; this in its turn will result in poor sensitometric results (too low a gradation, maximum density and speed). On the other hand too low a degree of hardening evidently will give rise to unsatisfying physical properties like a poor abrasion resistance, and to excessive drying times after processing.

One can readily imagine that the concept of "differential hardening" of a multilayer photographic element, meaning that not all the layers show the same degree of hardening, would provide the photographic material designer with an advantageous additional degree of freedom. For instance, in the simple case of a two-layer arrangement, a strongly hardened top protective layer and a moderately hardened emulsion layer could provide at the same time a high abrasion resistance of the surface and a good developability and fixability of the emulsion layer. However, such a differential hardening is not easy to realize by conventional means. Even when the hardening agent is added to the coating solutions and the ratio hardener/gelatin is established substantially different for both coating solutions the concentration of hardener will tend to equalize in both layers on coating due to the diffusibility of most hardeners. In an alternative way of doing, usually employed with fast acting hardeners, an extra low viscosity layer containing the hardener is applied on the gelatinous layer pack already coated and dried. In this case the layer pack swells again on taking up the hardener solution, and the hardener will be distributed practically in a homogeneous way before the hardening reaction takes on.

In resolving this problem the concept of a modified gelatin comes to aid. If one layer of a multilayer pack would contain normal gelatin and another layer would contain a modified gelatin with stronger reactivity than normal gelatin towards a certain type of hardener a differentially hardened material could be realized.

Scientific and patent literature is replete with references concerning gelatin modifications chemically applied on the free amino functions. For instance, different types af acylated gelatins are disclosed in U.S. Pat. Nos. 2,525,753, 2,827,419, 3,486,896 and 3,763,138. Phtaloyl gelatins are described in U.S. Pat. No. 2,725,293 and BE 840,437. Reaction of gelatin with compounds containing active halogen atoms are disclosed in BE 614,426 and BE 1,005,787.

On the other hand disclosures concerning modification on the free carboxyl group are scarce. However such a modification type theoretically would offer several benefits : there are about three times more free carboxyl groups than free amino groups offering the possibility of a substantially higher degree of modification, and the latter would remain available for other reactions, e.g. hardening. In U.S. Pat. No. 4,238,480 different reagents, a.o. ethylenediamine, are used to modify collagen into a substance with a more electropositive surface, which is used as a hemostatic agent. In International Application PCT/US91/04197, published as WO 91/20014, a gelatin is disclosed which is modified by reaction on part of the free carboxyl groups in the presence of (i) an "amide bond forming agent" and (ii) a well-defined type of diamine, triamine or cyclic diamine, e.g. piperazine. In this way additional end-standing amino functions were introduced in the gelatin molecule, which, moreover, proved to be more reactive to vinylsulphonyl hardeners than the original ones.

The present invention deals with a further extension of the teachings of WO/9120014 cited above.

It is an object of the present invention to provide new types of modified gelatin which are more reactive towards a vinylsulphonyl type hardener than conventional unmodified gelatin.

It is another object of the present invention to provide new types of hardened modified gelatin.

It is still another object of the present invention to provide a hydrophilic coated element, in particular a photographic element, which contains such a new type of hardened modified gelatin.

It is a still further object of the present invention to provide a multilayer hydrophilic element, more particularly a photographic element, which shows differential hardness.

SUMMARY OF THE INVENTION

The objects of the present invention are realized by providing a modified gelatin according to general formula (I):

Gel—CO—NR¹—L—X                    (I)

wherein

Gel is a gelatin polypeptide, —CO— is a carbonyl group from part of the free carboxyl groups originally present in an aspartic acid or glutamic acid moiety in said gelatin polypeptide, X is a group selected from the group consisting of: —NHR², —SO₂M, —SM, M is hydrogen or a cation, R¹ and R², when present, each independently represent hydrogen, substituted or unsubstituted alkyl, substituted or unsubstituted aryl, substituted or unsubstituted cycloalkyl, L represents a divalent linking group selected from the group consisting of:

(i) an aliphatic alkylene chain comprising n carbon atoms, wherein n is at least 3 when X represents —NHR², and n is at least 2 when X represents —SO₂M or —SM, said aliphatic alkylene chain can be further substituted by substituted or unsubstituted alkyl, substituted or unsubstituted aryl, substituted or unsubstituted cycloalkyl, one or more pairs of said substituents on said alkylene chain can combine together to form a ring, said alkylene chain can be interrupted by one or more heteroatoms;

(ii) a substituted or unsubstituted cycloalkylene group;

(iii) a substituted or unsubstituted arylene group;

(iiii) a substituted or unsubstituted aromatic heterocyclic group.

These modified gelatine types proved to be more reactive towards vinylsulphonyl hardeners than the corresponding unmodified gelatin. Under the same hardening conditons gelatinous layers could be obtained showing a higher degree of hardening when using a modified gelatin type than when using the unmodified type. Moreover, when X represents —SO₂M or —SM the modified gelatin retains its hardening properties even at relative low pH. In this way a multilayer element, in particular a photographic material, can be realized having differential hardness by incorporating a hardened modified gelatin in one layer and a hardened unmodified gelatin in another layer.

DETAILED DESCRIPTION OF THE INVENTION

Figure 1A:
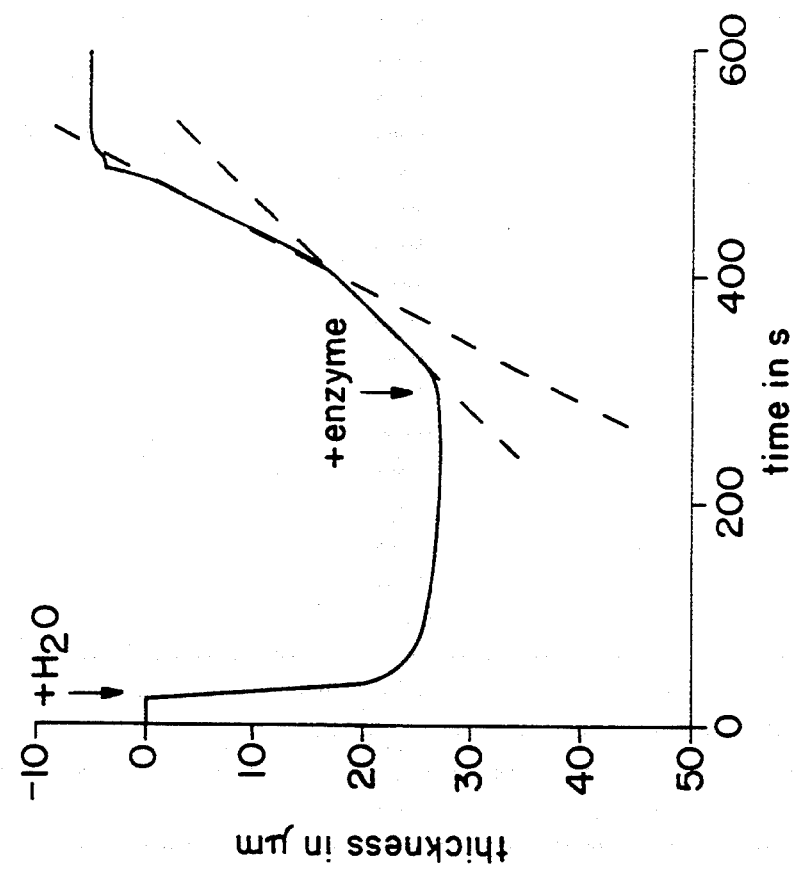

The modification involves reaction of part of the free carboxyl groups of the gelatin polypeptide chain. The preparation procedure is basically the same as described in WO 91/20014. The reaction mixture contains gelatin, an "amide bond forming agent", and a modifying agent of general formula NHR¹—L—X. In a first stage a free carboxyl reacts with the "amide bond forming agent" to form a so-called "activated carboxyl group". Then the "amide bond forming agent" is replaced by the modifying agent moiety under formation of an amide bond, which is a stable bond that will not readily be hydrolyzed. In this way a new end-standing amino, sulphinic acid or thiol function, showing nucleophilic reactivity towards olephinic hardeners, is created depending on the nature of X in the modifier molecule.

The amide bond forming agents for use in this invention can include, for example, carbodiimides as described in Berichte der Deutschen Chemischen Gesellschaft, Vol. 71 IIp. 1933 (1938), and Bull. Soc. Chem. France, p.1360 (1956); dihydroquinone compounds as disclosed in DE 2322317; carbamoylpyridinium salts as disclosed in DE 2225230, DE 2317677 and DE 2439551; carbamoyloxypyridinium salts as described in DE 2408814; and amidinium ether compounds as claimed in U.S. Pat. No. 4,877,724.

Preferred amide bond forming compounds are carbamoylpyridinium and carbamoyloxypyridinium salts. A most useful compound (see preparative examples furtheron) is:

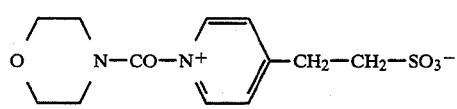

CPS-1

As stated earlier these preferred amide bond forming agents are themselves fast acting hardeners for gelatin. Indeed, after activation by the amide bond forming agent of a free carboxylic group an amide bond can readily be formed with a free amino function on the same or another polypeptide chain. This results in a raise of the high-molecular mass fraction and cross-linking of the gelatin. In the modification process this premature cross-linking is an unwanted side reaction which ought to be suppressed. This can be done by establishing in the reaction mixture a low concentration of gelatin, preferably about 1 to 3 % by weight, and a high excess of modifying agent. By doing so the activated carboxyl group will react more readily with a modifier molecule than with a free lysine or arginine amino group.

Preferred modifying agents for the preparation of the modified gelatin types of the present invention include following compounds:

(a) when —X in general formula (I) is —NHR$^2$:
triethyleneglycoldiamine;
1,4-diaminocyclohexane;
4-(2-aminoethyl)piperazine;
1,3,5-triaminobenzene-trihydrochloride
3,4-diaminobenzene-sulphonic acid
(b) when —X is —SO$_2$M
4-amino-benzene-sulphinic acid;
2-amino-ethane-sulphinic acid;
cetylamino-methane-sulphinic acid-sodium salt
4-(4-amino-3-methyl-phenoxy)-butane-sulphinic acid;
[4-(2-amino-5-phenacylamino)-phenyl-sulphonamido]-ethane-sulphinic acid;
3-amino-4-methoxy-benzene-sulphinic acid;
2-amino-5-nitro-benzene-sulphinic acid;
2-amino-benzene-sulphinic acid-sodium salt;
5-amino-2-methyl-benzene-sulphinic acid-sodium salt;
3-amino-benzene-sulphinic acid;
5-amino-2-methoxy-benzene-sulphinic acid-sodium salt;
3,5-diamino-benzene-sulphinic acid;
4-amino-benzene-sulphinic acid;
4-amino-2-chloro-benzene-sulphinic acid;
(c) when —X is —SM:
2-aminomethanethiol;
2-amino-4-chloro-benzene-thiol;
3-amino-4-chloro-benzene-thiol;
4-amino-3,5-dimethyl-benzene-thiol;
2-amino-5-methoxy-benzene-thiol;
2-amino-4,5-dimethyl-benzene-thiol;
4-amino-2-methoxy-benzene-thiol;
2-amino-4-methoxy-benzene-thiol;
3-amino-1,5-pentane-dithiol;
4-amino-3-chloro-5-methyl-benzene-thiol;
4-amino-3,5-dichloro-benzene-thiol;
4-amino-3,5-dimethoxy-benzene-thiol;
2-amino-4,5-dimethoxy-benzene-thiol;
2-amino-3,5-dichloro-benzene-thiol;
2-amino-5-methoxy-benzene-potassium thiolate;
3-amino-2-mercapto-benzoic acid-methylester;
3-amino-5-phenyl-1-pentane-thiol;
2-amino-benzene-thiol;
2-amino-4-methyl-benzene-thiol;
2-amino-4-chloro-benzene-thiol;
3-amino-benzene-thiol;
3-amino-4-chloro-benzene-thiol;
4-amino-3-methyl-benzene-thiol;

The reaction is performed in an aqueous medium preferably containing 1% to about 15% of gelatin. The start gelatin can be any type of conventional gelatin, e.g. low-viscosity, medium-viscosity or high-viscosity type gelatin; the viscosity typically ranges from 8 to 60 mPa.s (values for a 10% aqueous solution at 40° C., measured by a Haake Rotovisco RV2 viscosimeter with sensor system NV at a shear rate of 1000 s$^{-1}$). THe gelatin can either be free of Calcium or contain Calcium (up to 0.55%). In principle gelatin can be used which is already partially modified in some way.

The amide bond forming agent is added in an amount preferably between 0.01 and 2 equivalents with regard to the free carboxyl groups present, depending on the desired degree of modification. The modifying agent is present in an amount preferably equivalent with 2 to 10 times the amount of amide bond forming agent. The modifying agent is preferably added before the amide bond forming agent. For reasons explained earlier a rather low concentration of gelatin and a rather high excess of modifying agent are preferred. The reaction is preferably conducted at ambient pressure at 40° C.-80° C., for 5 minutes to about 24 hours. The initial pH is preferably established between 5.0 and 5.5. After the modification reaction is finished the resulting material is washed thoroughly, preferably by ultrafiltration, in order to remove unreacted starting reagents and low-molecular weight by-products.

A modified gelatin can be characterized in various ways. An important parameter is the degree of modification expressed as the percentage of free carboxyl groups modified. From knowledge of the amount of milli-equivalents free carboxyl groups in the original gelatin and from the concentration of the reagents, the theoretical maximal percentage of carboxyl groups modified can be calculated. The actually obtained degree of modification can be determined from an acid - base titration. From these two values the yield of the modification can be calculated. Beside, the molecular mass distribution of the modified gelatin, and more particularly the share of the high-molecular mass fraction can be determined by a chromatographic technique. Furtheron the isoelectric point of the modified gelatin can be determined and compared to the one from the original unmodified gelatin. When —X is —NHR$^2$ the new isoelectric point will be shifted to a higher pH value. However, incorporation of a gelatin with too high a isoelectric point holds the danger for incompatibility with other common photographic ingredients, e.g. flocculation with anionic latices. So the introduction of new end-standing aminofunctions must be restricted to certain limits; in practice the modification degree must be limited to about 40%. On the other hand, in the particular embodiments of the present invention where —X is an end-standing sulphinic acid or thiol residue the isoelectric point undergoes only a little shift or no shift at all. This forms a particularly advantageous feature of those embodiments of the present invention. Moreover, with terminal amino functions the reactivity towards olephinic hardeners becomes impractically low at low pH values, say at and under pH 4.0. This is not the case with end-standing sulphinic acid or thiol moieties which retain their reactivity even at such a relative low pH. This can be important under circumstances where hardening at low pH is desired, for instance, when developing agents are incorporated in a photographic material. This forms a second advantage of those particular embodiments of the present invention.

The modified gelatines of the present invention can be hardened with any type of conventional hardener known in the art. However, the benefits of the present invention will become particularly clear when the hardener used is of the vinylsulphonyl type, because this type of hardener shows an enhanced reactivity towards the newly introduced functional end-standing groups. Under comparable hardening conditions a stronger hardened gelatin is obtained with the modified type than with the original unmodified type. In principle, a mixture of a vinylsulphonyl hardener and another hardener type, or a mixture of two vinylsulphonyl hardeners can be used. For normal practice however, one vinylsulphonyl compound will be sufficient. A preferred compound is bis(vinylsulphonyl)methane (BVSM). This new type of hardened modified gelatin, which explicitly forms part of the present invention, can be represented by following formula (II):

Gel—CO—NR$^1$—L—X'—(ViSu)—(X'—L—NR$^1$—CO)$_m$—Gel  (II)

wherein ViSu is a bridging group derived from a vinylsulphonyl hardener, X' is derived from X, defined above by removal of H or M, m is 1 or 0, and the other symbols have the same meaning as defined above.

It will be readily understood that two forms of hardened modified gelatin are possible. The ViSu moiety can bridge between two newly introduced end-standing functional groups. In this case m equals 1. Otherwise the ViSu bridge can be built-in between just one new functional group and an existing amino group from e.g. lysine or arginine. In this case m equals 0.

In principle the new type of hardened gelatin can be present in a one-layer hydrophilic coating or in all the layers of a multilayer hydrophilic element, e.g. a photographic element. The benefits of the present invention however become particularly clear by providing a multilayer element, in particular a photographic material, showing differential hardness, in which at least one layer contains hardened modified gelatin and at least one other layer contains hardened unmodified gelatin. In its simplest form such a photographic element comprises a support, a photosensitive silver halide emulsion layer, e.g. containing a hardened unmodified gelatin, and a top protective layer containing a hardened modified gelatin. More complicated arrangements are however possible; extra sensitive layers, undercoats, intermediate layers and backing layers can be present, some of them containing hardened modified gelatin and some of them containing hardened unmodified gelatin. Such photographic elements explicitly form part of the present invention.

The hardening procedure can take several forms well known to those skilled in the art. The hardening agent can be added to the various coating solutions preferably just before coating. Alternatively the gelatinous layers can be coated first without hardener and than they can be imbibed in a hardening solution, or, more practically, an additional low-viscosity coating solution containing the hardener can be applied on top of the gelatinous layers already coated. Usually the hardening reaction starts when the coated wet swollen layers become concentrated on drying; generally the reaction proceeds for several days in the finished dried multi-layer pack, as can be seen from the progressing increase in abrasion resistance. After stabilization of the hardening process a differential hardness, if present, can be physically proved by a velocity gradient in a degradation experiment of a multi-layer gelatinous element by a proteolytic enzyme, as will be demonstrated in an example furtheron.

The composition of the silver halide emulsion incorporated in a photographic element of the present invention is not specifically limited and may be any composition selected from e.g. silver chloride, silver bromide, silver iodide, silver chlorobromide, silver bromoiodide, and silver chlorobromoiodide.

The photographic emulsion(s) can be prepared from soluble silver salts and soluble halides according to different methods as described e.g. by P. Glafkidés in "Chimie et Physique Photographique", Paul Montel, Paris (1967), by G. F. Duffin in "Photographic Emulsion Chemistry", The Focal Press, London (1966), and by V. L. Zelikman et al in "Making and Coating Photographic Emulsion", The Focal Press, London (1966).

Two or more types of silver halide emulsions that have been prepared differently can be mixed for forming a photographic emulsion. The average size of the silver halide grains may range from 0.05 to 1.0 micron, preferably from 0.2 to 0.5 micron. The size distribution of the silver halide particles can be homodisperse or heterodisperse.

The light-sensitive silver halide emulsions are preferably chemically sensitized as described e.g. in the above-mentioned "Chimie et Physique Photographique" by P. Glafkidés, in the above-mentioned "Photographic Emulsion Chemistry" by G. F. Duffin, in the above-mentioned "Making and Coating Photographic Emulsion" by V. L. Zelikman et al, and in "Die Grundlagen der Photographischen Prozesse mit Silberhalogeniden" edited by H. Frieser and published by Akademische Verlagsgesellschaft (1968).

The light-sensitive silver halide emulsions can be spectrally sensitized with methine dyes such as those described by F. M. Hamer in "The Cyanine Dyes and Related Compounds", 1964, John Wiley & Sons. Dyes that can be used for the purpose of spectral sensitization include cyanine dyes, merocyanine dyes, complex cyanine dyes, complex merocyanine dyes, hemicyanine dyes, styryl dyes and hemioxonol dyes. Particularly valuable dyes are those belonging to the cyanine dyes, merocyanine dyes and complex merocyanine dyes.

The silver halide emulsion(s) for use in accordance with the present invention may comprise compounds preventing the formation of fog or stabilizing the photographic characteristics during the production or storage of photographic elements or during the photographic treatment thereof. Many known compounds can be added as fog-inhibiting agent or stabilizer to the silver halide emulsion.

The multi-layer gelatinous element of the present invention, more particularly the photographic material, may further comprise various kinds of surface-active agents in the photographic emulsion layer or in another hydrophilic colloid layer. Suitable surface-active agents include non-ionic agents such as saponins, alkylene oxides e.g. polyethylene glycol, polyethylene glycol/-polypropylene glycol condensation products, polyethylene glycol alkyl ethers or polyethylene glycol alkylaryl ethers, polyethylene glycol esters, polyethylene glycol sorbitan esters, polyalkylene glycol alkylamines or alkylamides, silicone-polyethylene oxide adducts, glycidol derivatives, fatty acid esters of polyhydric alcohols and alkyl esters of saccharides; anionic agents comprising an acid group such as a carboxy, sulpho, phospho, sulphuric or phosphoric ester group; ampholytic agents such as aminoacids, aminoalkyl sulphonic acids, aminoalkyl sulphates or phosphates, alkyl betaines, and amine-N-oxides; and cationic agents such as alkylamine salts, aliphatic, aromatic, or heterocyclic quaternary ammonium salts, aliphatic or heterocyclic ring-containing phosphonium or sulphonium salts. Such surface-active agents can be used for various purposes e.g. as coating aids, as compounds preventing electric charges, as compounds improving slidability, as compounds facilitating dispersive emulsification, as compounds preventing or reducing adhesion, and as compounds improving the photographic characteristics e.g higher contrast, sensitization, and development acceleration. Preferred surface-active coating agents are compounds containing perfluorinated alkyl groups.

The photographic elements may further comprise various other additives such as e.g. compounds improving the dimensional stability of the photographic element, UV-absorbers, light-absorbing dyes such as filter dyes and anti-halation dyes spacing agents and plasticizers. In case of a photographic colour material the typical ingredients like colour forming agents, mask forming agents, Development Inhibitor Releasing couplers, and other Photographic Useful Group releasing couplers can be present.

The support of the photographic material can be a transparent base, preferably an organic resin support, e.g. cellulose nitrate film, cellulose acetate film, polyvinylacetal film, polystyrene film, polyethylene terephthalate film, polycarbonate film, polyvinylchloride film or poly-Alpha-olefin films such as polyethylene or polypropylene film. The thickness of such organic resin film is preferably comprised between 0.07 and 0.35 mm. These organic resin supports are preferably coated with a subbing layer. On the other hand the support of the photographic material can be a paper base preferably a polyethylene or polypropylene coated paper base.

The photographic material can be exposed according to its particular composition and application, and processed by any means or any chemicals known in the art depending on its particular application. This field of use of the material is not limited in any way. It includes photographic elements for graphic arts and for so-called amateur and professional black-and-white or colour photography, cinematographic recording and printing materials, X-ray diagnosis, diffusion transfer reversal photographic elements, low-speed and high-speed photographic elements, etc.

The following examples, comprising preparation of modified gelatins, their characterization and their evaluation in a two-layer coated element illustrate the present invention without however limiting it thereto.

THE DRAWING

Figure 1B:
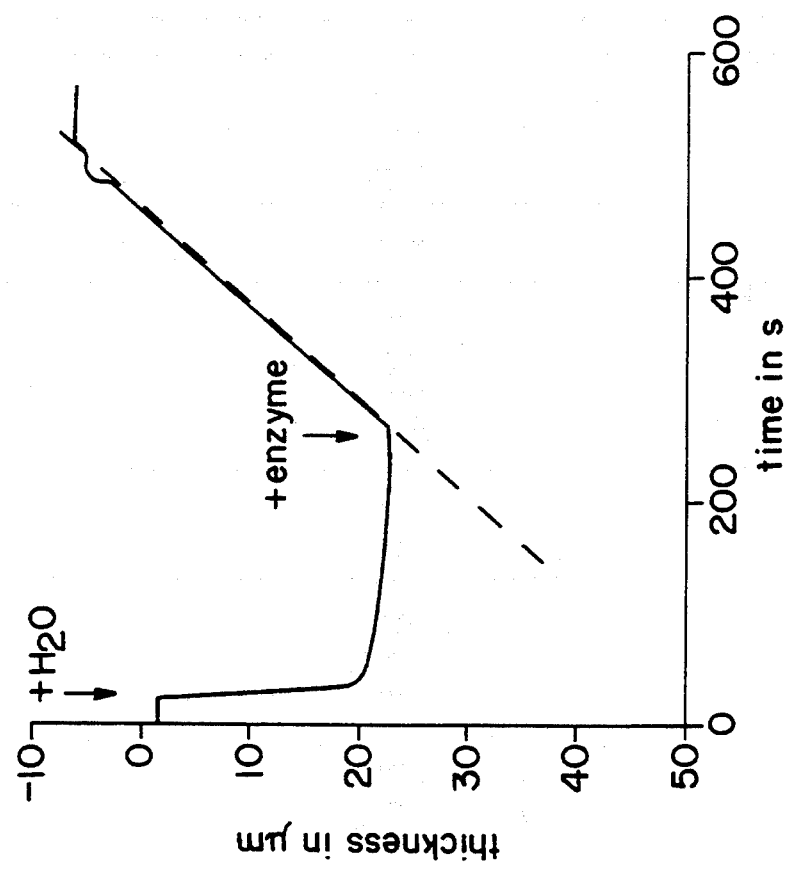

In the drawings, FIGS. 1a and 1b are enzymatic degradation curves illustrating the evolution of the thickness of the swollen layer pack as a function of time.

EXAMPLES

1. Preparative Example

Preparation of modified gelatin 1.1.

150 g of gelatin was allowed to swell for 30 minutes at room temperature in 2100 g of distilled water and was subsequently dissolved by raising the temperature to 50° C. After one hour an amount of 82.8 milli-equivalents of triethyleneglycoldiamine (marketed by Jefferson Co as compound EDR148) diluted with distilled water to 50 ml was added to the gelatin solution. The pH was adjusted to 5.2. Then 200 ml of an aqueous solution, containing 27.6 mill-equivalents of carbamoylpyridinium salt compound CPS-1 (see description), was added to the reaction mixture, which was then allowed to stand at 50° C. for 3 hours. The resulting modified gelatin was subjected to ultrafiltration in order to eliminate the excess of triethyleneglycoldiamine and the low molecular weight reaction products. Finally, 50 ml of a preservative containing phenol was added before storing the modified gelatin at 5° C.

All other modified gelatines were prepared following a similar procedure. The reaction conditions are summarized in following table 1. The amounts of reagents, in grams and milli-equivalents (meq), were expressed relative to 100 g of gelatin. The reaction time was always 3 hours and the start pH was always 5.2. The modifying agents were:

(1) : triethyleneglycoldiamine;
(2) : 1,4-diaminocyclohexane;
(3) : 4-aminobenzene-sulphinic acid;
(4) : 2-aminoethanethiol

TABLE 1

| No. | conc. gel. | modifier | amount modifier g | amount modifier meq | amount CPS-1 g | amount CPS-1 meq |
| --- | --- | --- | --- | --- | --- | --- |
| 1.1 | 6% | (1) | 8.2 | 55.2 | 5.52 | 18.4 |
| 1.2 | 2% | (1) | 16.4 | 110.4 | 11.04 | 36.8 |
| 1.3 | 2% | (1) | 32.8 | 220.8 | 22.1 | 73.6 |
| 1.4 | 2% | (1) | 8.2 | 55.2 | 5.52 | 18.4 |
| 2.1 | 2% | (2) | 10.5 | 92 | 5.52 | 18.4 |
| 2.2 | 2% | (2) | 21 | 184 | 11.04 | 36.8 |
| 2.3 | 2% | (2) | 42 | 368 | 22.1 | 73.6 |
| 2.4 | 2% | (2) | 65.9 | 575 | 34.5 | 115 |
| 2.5 | 2% | (2) | 131.7 | 1149 | 69 | 230 |
| 3.1 | 2% | (3) | 14.4 | 92 | 5.52 | 18.4 |
| 3.2 | 2% | (3) | 28.9 | 184 | 11.04 | 36.8 |
| 3.3 | 2% | (3) | 57.9 | 368 | 22.1 | 73.6 |
| 3.4 | 2% | (3) | 90.4 | 575 | 34.5 | 115 |
| 3.5 | 2% | (3) | 180.7 | 1149 | 69 | 230 |
| 4.1 | 2% | (4) | 65.3 | 575 | 34.5 | 115 |

2. Characterization of modified gelatines

The experimentally obtained percentual modification degree was determined by means of an acid - base titration. By comparison with the maximal degree of modification the yield of the modification reaction was calculated.

Of the modified gelatines molecular mass distributions were determined by means of Gel Permeation Chromatography (using SUPEROSE 6 PREP-GRADE, products and apparatus obtained from Pharmacia Co). From this distribution the fraction of microgel was determined, being the fraction with a molecular mass higher than 450 000 Dalton. For the unmodified gelatin the microgel fraction amounted to 14%.

The results are summarized in table 2.

TABLE 2

| No | % CPS-1 vis-à-vis free —COOH | real % of modif. | yield | % microgels |
| --- | --- | --- | --- | --- |
| 1.1 | 16% | 9% | 56% | 30% |
| 1.2 | 32% | 19% | 58% | 21% |
| 1.3 | 64% | 36% | 56% | 17% |
| 1.4 | 16% | 12% | 76% | 23% |
| 2.1 | 16% | 10% | 62% | |
| 2.2 | 32% | 19% | 59% | |
| 2.3 | 64% | 33% | 52% | |
| 2.4 | 100% | 50% | 50% | |
| 2.5 | 200% | 76% | 38% | |
| 3.1 | 16% | 7.6% | 47% | |
| 3.2 | 32% | 5.3% | 17% | |
| 3.3 | 64% | 8.2% | 13% | |
| 3.4 | 100% | 7.9% | 8% | |
| 3.5 | 200% | 9.3% | 5% | |
| 4.1 | 100% | 9.8% | 9.8% | |

From the table it can be seen that when the end-standing group after modification is amino the yield is usually comprised between 50% and 70%. When the end-standing group is sulphinic acid or thiol the yields are lower. From comparison of 1.1 and 1.4 it is clear that a better yield and less microgel formation is obtained when the gelatin concentration is low and the excess modifier is high.

3. Evaluation of differential hardening

On a transparent polyethylene terephtalate support a series of two-layer hydrophilic packs were coated, comprising an undercoat of 3 g/m² of unmodified gelatin and an overcoat of 3 g/m² of each of the prepared modified gelatines. A comparison sample was coated with two layers of unmodified gelatin. These layer packs were hardened with 0.035 moles of bis(vinylsulphonyl)methane per kg of total gelatin. The hardener was dosed immediately before coating to the overcoat coating solution.

Enzymatic degradation was performed on the thus coated two-layer elements using the proteolytic enzyme PROTEASE 660L (obtained from Solvay Co.). The evolution of the thickness of the swollen layer pack was followed as a function of time. A typical example of such a curve is represented in FIGS. 1a and 1b.

It is clear that two distinct slopes appear in the degradation curve (1b) when modified gelatin is present in the top layer. This proves that the top layer is hardened to a substantially stronger degree than the layer adjacent to the support. On the contrary only one slope appears in the degradation curve of the control sample (1a) containing unmodified gelatin in both layers.

We claim:

1. Modified gelatin according to general formula (I):

wherein

Gel is a gelatin polypeptide, —CO— is a carbonyl group from part of the free carboxyl groups originally present in an aspartic acid or glutamic acid moiety in said gelatin polypeptide, X is a group selected from the group consisting of: —$SO_2M$, and —SM, M is hydrogen or a cation, $R^1$ and $R^2$, when present, each independently represent hydrogen, alkyl, aryl, cycloalkyl, L represents a divalent linking group selected from the group consisting of:
  (i) an aliphatic alkylene chain comprising n carbon atoms,
  wherein
  n is at least 2 when X represents —$SO_2M$ or —SM,
  said aliphatic alkylene chain can be further substituted by alkyl, aryl, cycloalkyl,
  one or more pairs of said substituents on said alkylene chain can combine together to form a ring,
  said alkylene chain can be interrupted by one or more heteroatoms;
  (ii) a cycloalkylene group;
  (iii) a arylene group; and
  (iiii) a aromatic heterocyclic group.

2. Modified gelatin according to claim 1 wherein —$NR^1$—L—X is derived from 4-amino-benzene-sulphinic acid by removal of one amino hydrogen.

3. Modified gelatin according to claim 1 wherein —$NR^1$—L—X is derived from 2-aminoethanethiol by removal of one amino hydrogen.

4. Hardened modified gelatin according to general formula (II):

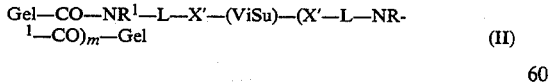

wherein ViSu is a bridging group derived from a vinylsulphonyl hardener, X' is derived from X from claim 1 by removal of H or M, m is 1 or 0, and the other symbols have the same meaning as in claim 1.

5. Hardened modified gelatin according to claim 4 wherein said bridging group represented by ViSu is derived from bis(vinylsulphonyl)methane.

6. Process for preparing a modified hardened gelatin represented by general formula (II) from claim 4, said process comprising reacting a vinylsulphonyl hardener with a modified gelatin according to claim 1.

7. Hydrophylic element comprising at least one layer containing a modified hardened gelatin according to claim 4.

8. Multi-layer hydrophilic element showing differential hardness, and comprising a support and at least one layer containing a hardened modified gelatin according to claim 4, and at least one layer containing an hardened unmodified gelatin.

9. Multi-layer hydrophylic element according to claim 8 wherein said element is a photographic element comprising at least one photosensitive layer.

10. Process for the preparation of a multilayer hydrophilic element showing differential hardness according to claim 8, said process comprising coating a support with at least one layer containing a modified gelatin according to claim 1, and at least one layer containing an unmodified gelatin, in the presence of a vinylsulphonyl hardener.

11. Process according to claim 10 wherein said vinylsulphonyl hardener is bis(vinylsulphonyl)methane.

12. Process according to claim 10 wherein said multilayer hydrophilic element showing differential hardness is a photographic element comprising at least one photosensitive layer.

13. Modified gelatin according to general formula (I):

wherein

Gel is a gelatin polypeptide, —CO— is a carbonyl group from part of the free carboxyl groups originally present in an aspartic acid or glutamic acid moiety in said gelatin polypeptide, and —$NR^1$—L—X is derived from triethyleneglycoldiamine by removal of one amino hydrogen.

14. Modified gelatin according to general formula (I):

wherein

Gel is a gelatin polypeptide, —CO— is a carbonyl group from part of the free carboxyl groups originally present in an aspartic acid or glutamic acid moiety in said gelatin polypeptide, and —$NR^1$—L—X is derived from 1,4-diaminocyclohexane by removal of one amino hydrogen.

* * * * *